(12) United States Patent
Lin

(10) Patent No.: US 8,922,125 B2
(45) Date of Patent: Dec. 30, 2014

(54) OCCUPANCY SENSOR FOR CONTROLLING AN LED LIGHT

(71) Applicant: IR-TEC International Ltd., Taoyuan County (TW)

(72) Inventor: Shih-Tsung Lin, Taoyuan County (TW)

(73) Assignee: IR-TEC International Ltd., Taoyuan County (TW)

( * ) Notice: Subject to any disclaimer, the term of this patent is extended or adjusted under 35 U.S.C. 154(b) by 60 days.

(21) Appl. No.: 13/746,557

(22) Filed: Jan. 22, 2013

(65) Prior Publication Data

US 2014/0203712 A1    Jul. 24, 2014

(51) Int. Cl.
| | |
|---|---|
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/00 | (2006.01) |

(52) U.S. Cl.
CPC ..................................... *H05B 37/02* (2013.01)
USPC ............................ 315/152; 315/315; 315/149

(58) Field of Classification Search
CPC ........... H05B 33/0869; H05B 33/0803; H05B 37/0207; H05B 37/0218; H05B 37/029; F21V 23/0442; G05B 11/017; Y02B 20/46
USPC .......................................... 315/152, 312, 149
See application file for complete search history.

(56) References Cited

U.S. PATENT DOCUMENTS

| | | | | |
|---|---|---|---|---|
| 5,489,891 | A * | 2/1996 | Diong et al. ................... | 340/567 |
| 2007/0108846 | A1* | 5/2007 | Ashdown ....................... | 307/149 |
| 2008/0224849 | A1* | 9/2008 | Sirhan ............................ | 340/521 |
| 2011/0193491 | A1* | 8/2011 | Choutov et al. ................ | 315/291 |
| 2012/0080944 | A1* | 4/2012 | Recker et al. ................... | 307/25 |
| 2012/0169242 | A1* | 7/2012 | Olson ............................. | 315/159 |
| 2013/0320876 | A1* | 12/2013 | Khalsa et al. .................. | 315/224 |

* cited by examiner

*Primary Examiner* — Dylan White
(74) *Attorney, Agent, or Firm* — Bacon & Thomas, PLLC

(57) ABSTRACT

An occupancy sensor for an LED module has an occupancy sensing module, a main control module and a current control module. The occupancy sensing module has capability of sensing occupancy status of a specific area. The main control module has capability of processing the signal from the occupancy sensing module and controlling. The current control module connects to the main control module and includes a current regulator, a power switch, a current sensor and a current controller. The current control module adjusts the duty cycle of the power switch based on the detected current through the LED module, thereby stabilizing the current output for the LED module.

8 Claims, 8 Drawing Sheets

OCCUPANCY SENSOR FOR CONTROLLING AN LED LIGHT

FIELD OF THE INVENTION

This invention relates to the field of light-emitting diode or LED light control, and in particularly, a method and apparatus of controlling the LED light.

BACKGROUND OF THE INVENTION

The application of solid-state lighting, mainly refer to light-emitting diode (LED) as light source is becoming more and more popular in lighting industry due to its dimmable light level output, superior energy efficiency and longer operation lifetime. Same as incandescent, LED is an ideal light source for occupancy sensor control which can further enhance energy efficiency and operation lifetime because of its physical and electrical characteristics. Occupancy sensor is an electrical switching device used to provide automatic light control by sensing the occupancy status of a specific area with the applied sensing technology. Traditionally, a line voltage switching occupancy sensor is used to control LED light. However, conventional on and off switching control cannot bring the benefit and performance of LED light into full play, especially its dimming capability.

An LED light is mainly comprised of an LED module and an LED driver which is classified in constant current (CC) or constant voltage (CV) type. Traditional triac-type dimmer will not be able to control the dim status of the LED light because of its electrical characteristic different from incandescent light. Thus, a special and normally higher cost dimmable LED driver will be needed for a dimmable LED light. With reference to FIG. 6, an occupancy sensor 70 or other control device must provide a dim control signal, usually 0-10V, to the dimmable LED driver 60 to regulate the power output to the LED module 80. This requirement is apparently a negative factor against the efforts of reducing the overall cost of the LED light.

Since the occupancy sensor 70 can effectively further improve the energy efficiency of the LED light, it would be desirable to have an occupancy sensor which can operate with the DC power supply from the LED driver, either in type of constant current or constant voltage, and provide regulated DC power to control the output level of the LED module. It would be more desirable if an occupancy sensor is able to control the LED light in pre-determined dim output according to the occupancy status and ambient light level.

Conventional line voltage switching occupancy sensor 70 requires an electro-mechanical device, usually a power relay 71 having contacts, to switch the mains power applied on the light. The electric arc generated while relay contacts switching will gradually damage the relay contacts and shorten the life expectancy of electro-mechanical device, therefore results in sensor failure. Some LED drivers could also generate exceptionally high volume of inrush current while being switch on, disregard of the rated current output. Such a high inrush current could also damage the relay contacts after a period of operation time. Thus, an occupancy sensor without needing electro-mechanical device built-in will be more appropriate for LED light control.

SUMMARY OF THE INVENTION

The present invention provides an occupancy sensor for the control of an LED light or LED light fixture.

In one aspect, the present invention provides an occupancy sensor that can be powered by DC current from either a constant current or a constant voltage LED driver, and provide regulated DC current to control the output of an LED module.

In another aspect, the present invention provides an occupancy sensor with capability of controlling the output of the LED module without needing any electro-mechanical switching device built-in.

In one embodiment, the occupancy sensor is comprised of an Occupancy Sensing Module (OSM), a Main Control Module (MCM) and a Current Control Module (CCM). The OSM is an assembly of an occupancy sensing element, a signal amplifier and a comparator. The MCM is a main controller with capability of processing the signal from the OSM, controlling the CCM to provide regulated current for the LED module. The CCM is comprised of a current regulator, a power switch, a current sensor and a current controller.

In yet another embodiment, the current regulator, power switch and current sensor of CCM are electrically connected between the LED driver and the LED module to control the current supply for the LED module.

The forgoing and other benefits and advantages of the present invention will be further apparent from the following detailed description of preferred embodiment and accompanying drawings. The detailed description and drawings are merely illustrative of the present invention, rather than limiting the scope of the invention being defined by the claims and equivalents thereof.

DETAILED DESCRIPTION OF THE PREFERRED EMBODIMENT

Figure 1:
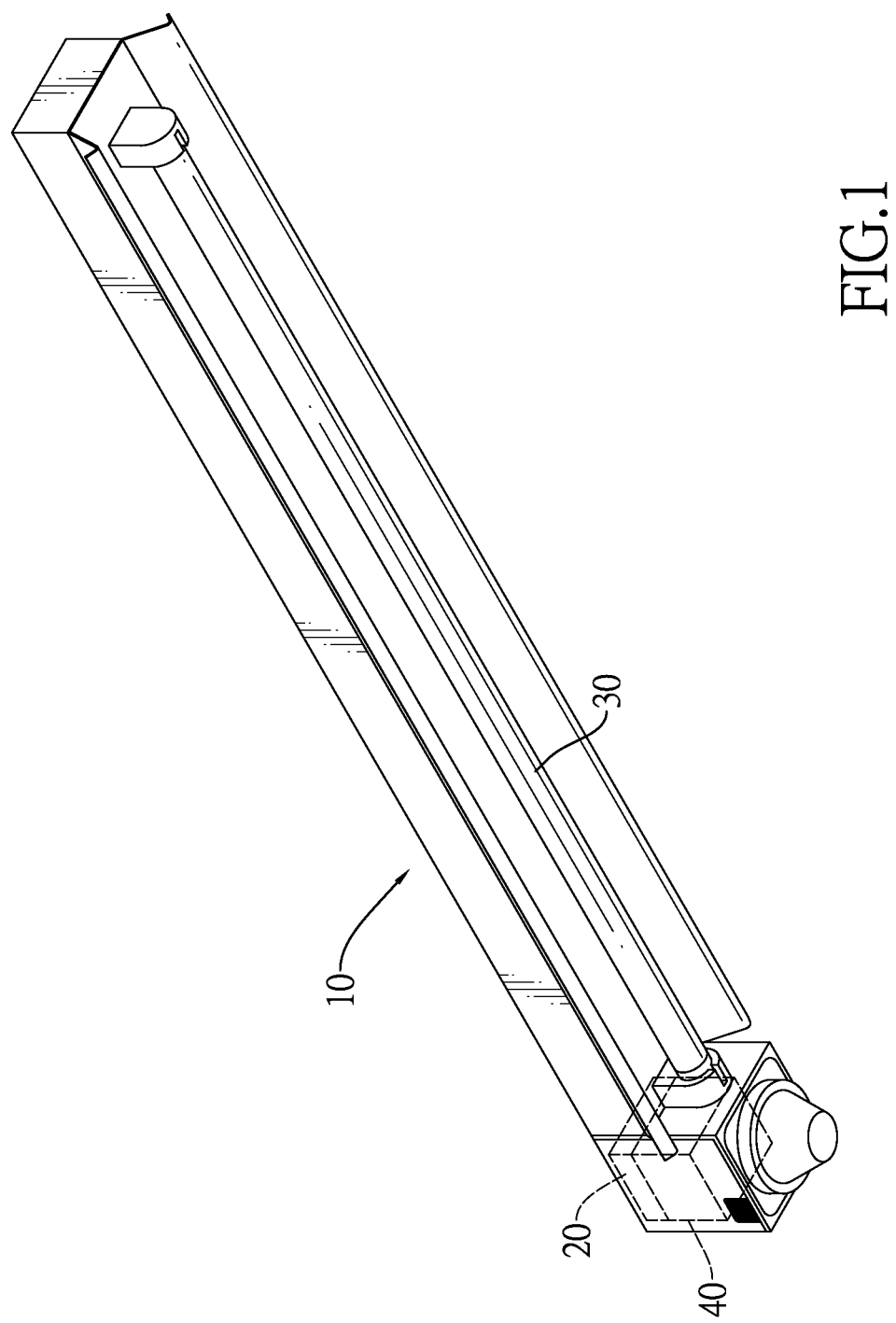
FIG. 1 shows a perspective view of an LED light with occupancy sensor integrated of a preferred embodiment of the invention.
Figure 2:
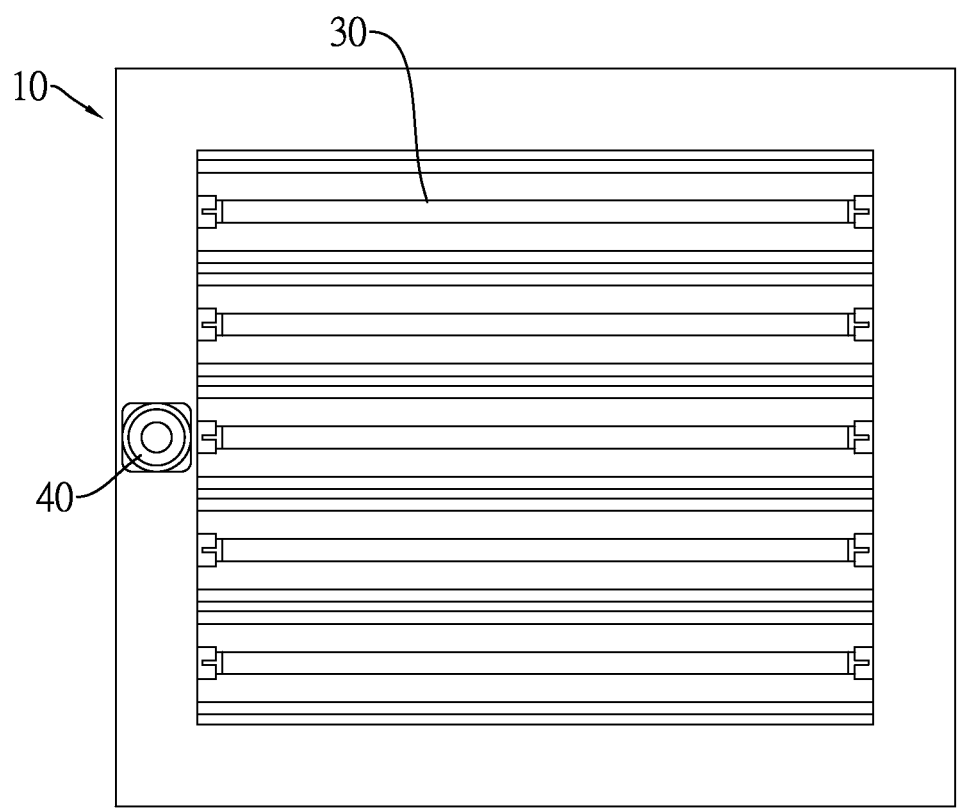
FIG. 2 shows a perspective view of another LED light with occupancy sensor integrated of the invention.
Figure 3:
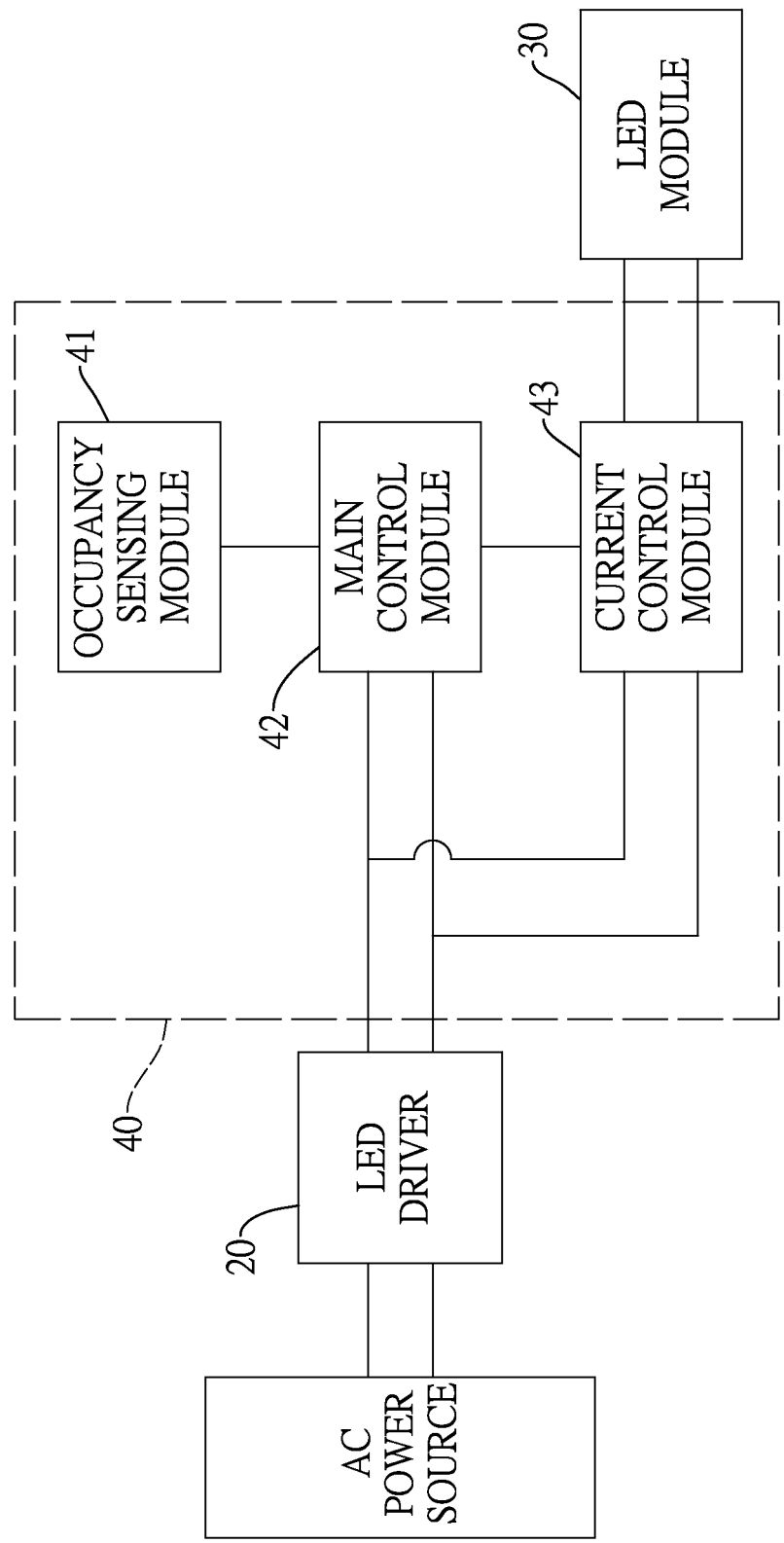
FIG. 3 shows the block diagram of the present invention.

With reference to FIGS. 1 to 3, an LED light 10 with occupancy sensor integrated of a preferred embodiment of the invention comprises an LED driver 20, an LED module 30 and an occupancy sensor 40.

The occupancy sensor 40 is mounted in the body 10 and electrically connected between the LED driver 20 and the LED module 30. With reference to FIG. 3, the occupancy sensor 40 includes an occupancy sensing module (OSM) 41, a main control module (MCM) 42 and a current control module (CCM) 43.

Figure 4A:
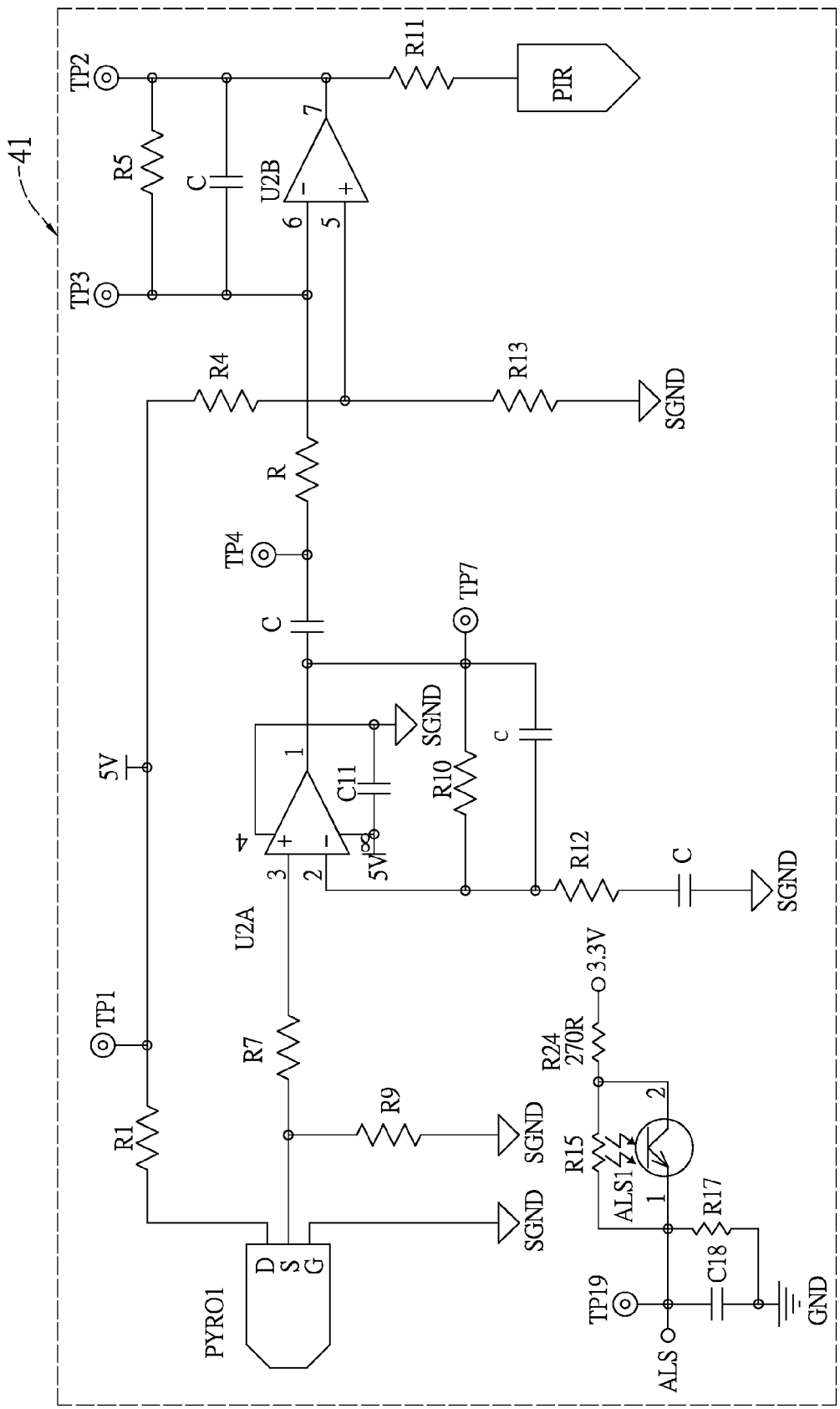
FIGS. 4A-4B show the circuit diagrams of the OSM and the MCM in FIG. 3.
Figure 4B:
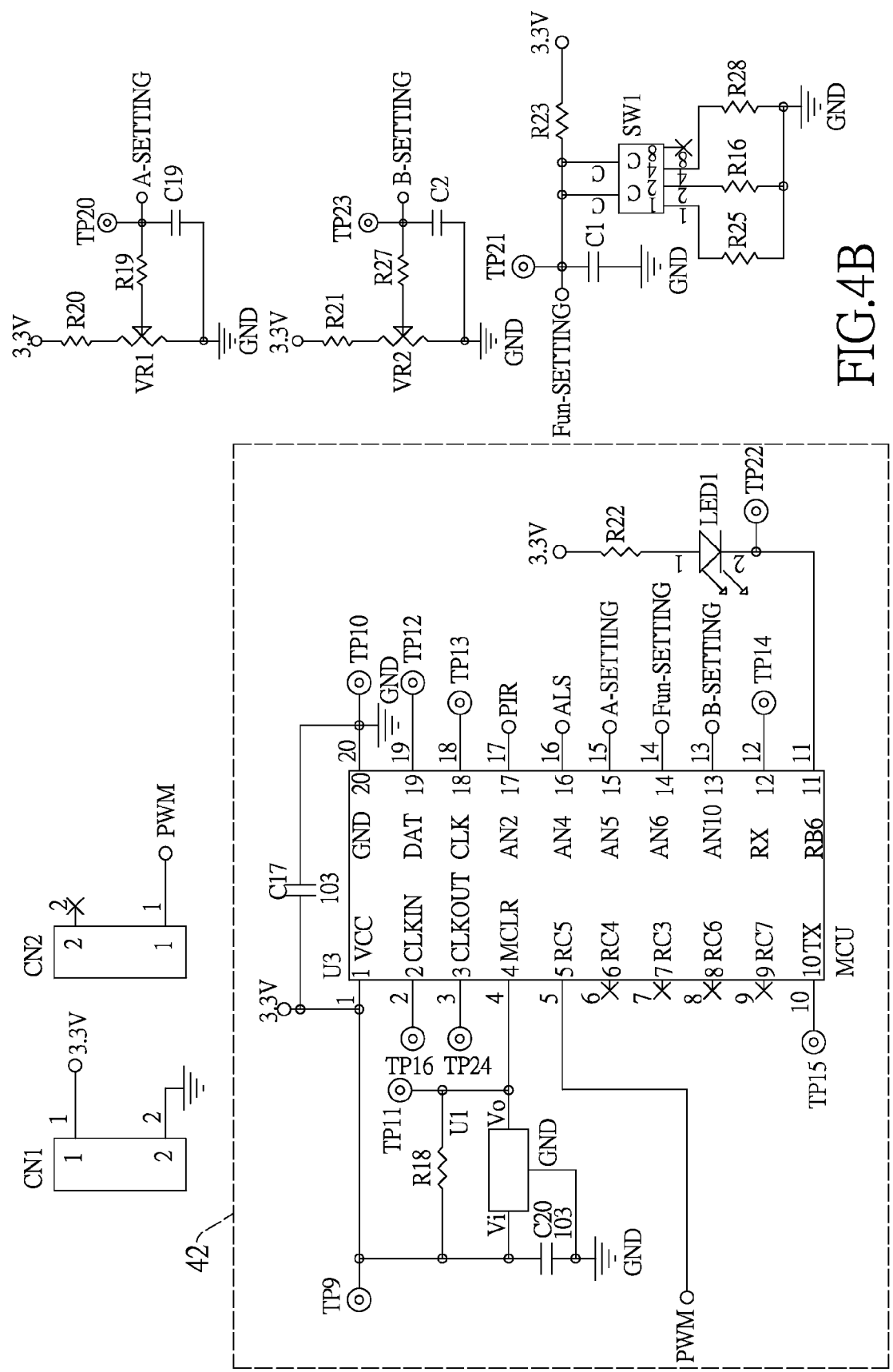

With reference to FIGS. 4A-4B, the occupancy sensing module 41 can sense whether any object enters a specific area and accordingly produce a sensing signal. The occupancy sensing module 41 may be a passive infrared sensor, an ultrasonic Doppler sensor, or a high frequency Doppler sensor.

The main control module 42 electrically connects to the occupancy sensing module 41. Upon receiving the sensing signal, the main control module 42 will output a brightness ratio.

Figure 5A:
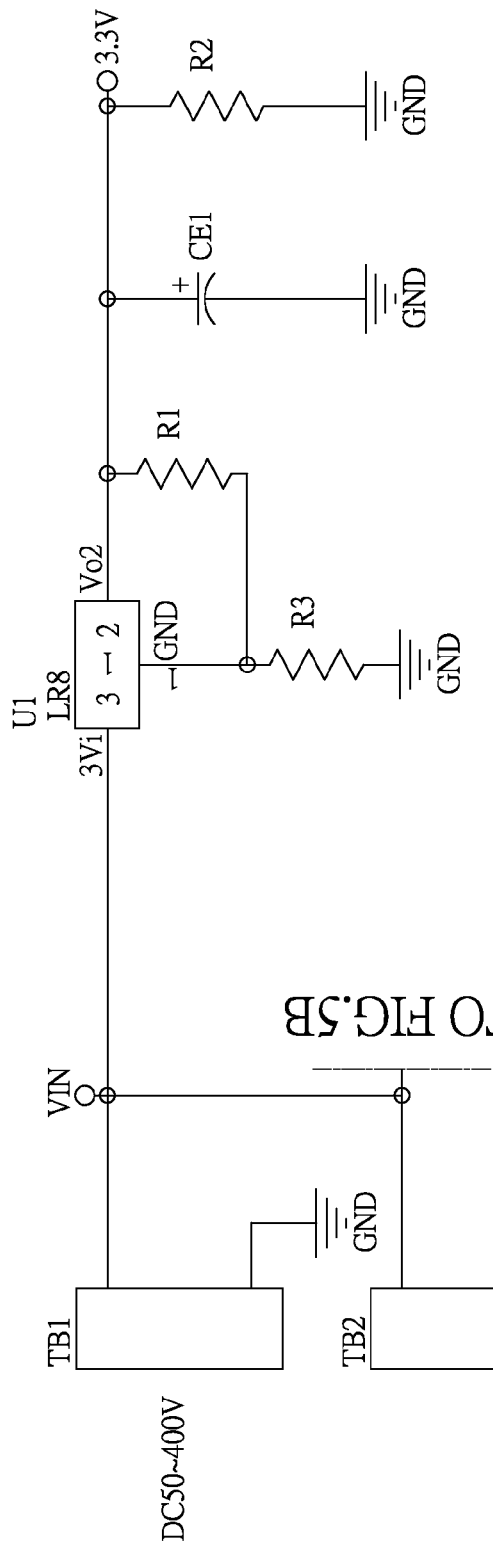
FIGS. 5A-5B show the circuit diagrams of the CCM in FIG. 3.
Figure 5B:
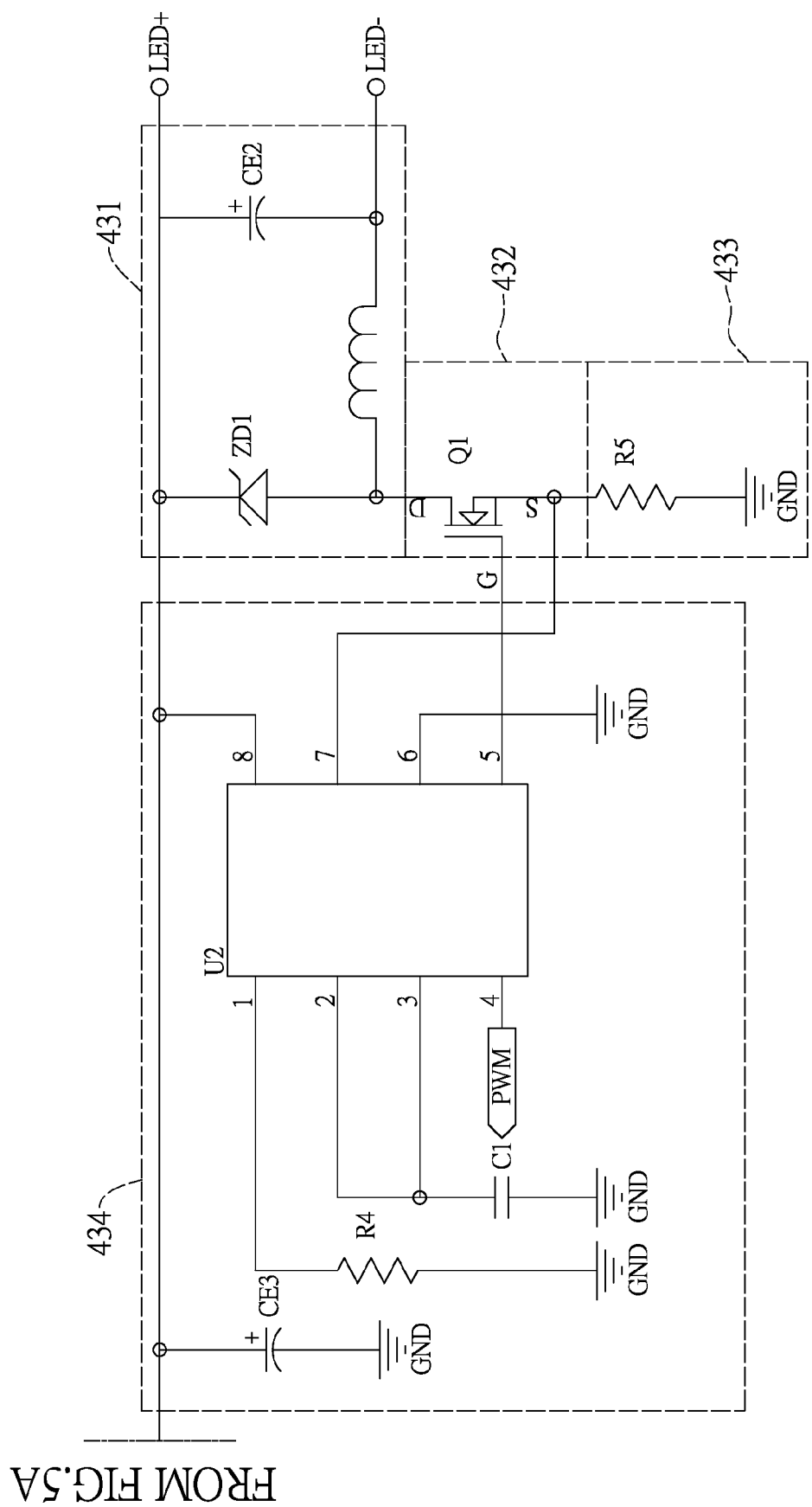
Figure 6:
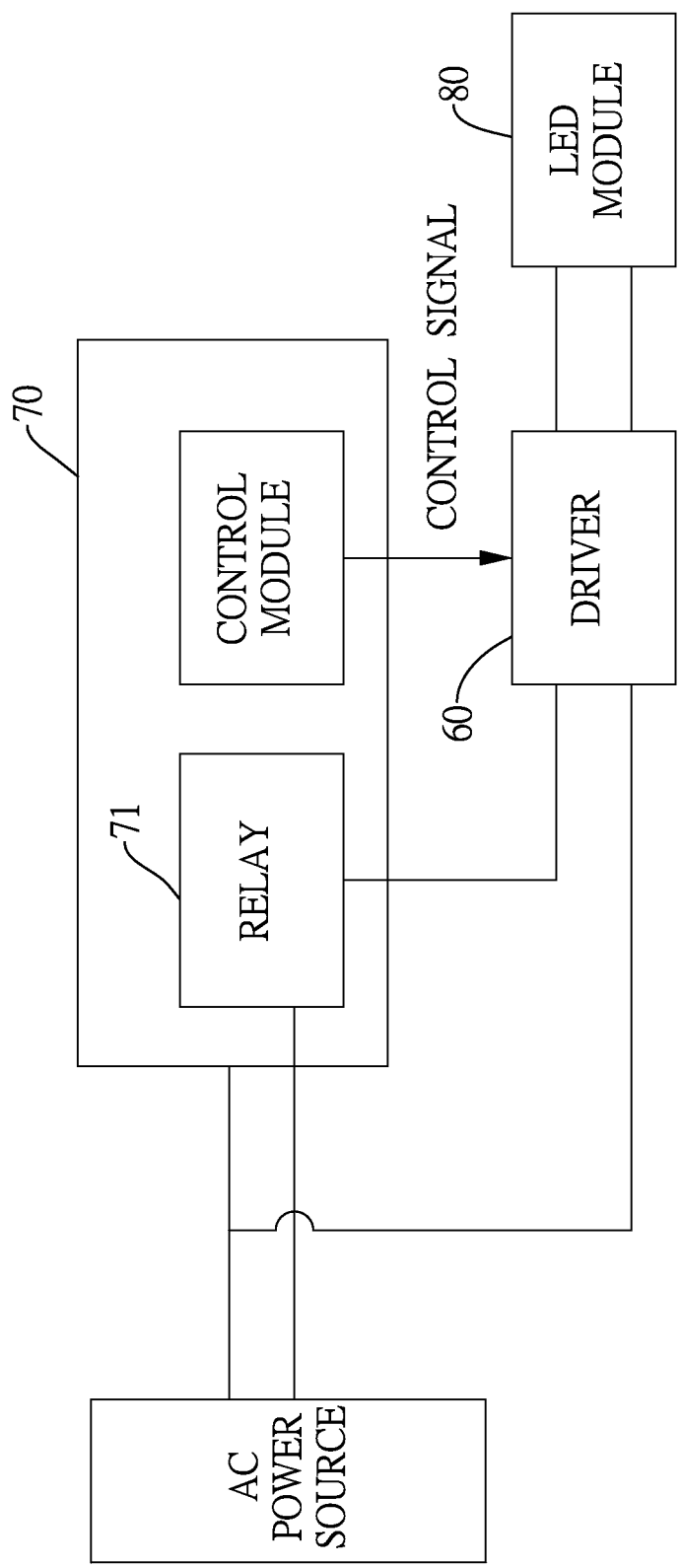
FIG. 6 shows the block diagram of a conventional LED control circuit.

With reference to FIGS. 5A-5B, the current control module 43 electrically connects to the main control module 42 and includes a current regulator 431, a power switch 432, a current sensor 433 and a current controller 434. The current regulator 431, the power switch 432, and the current sensor 433 are connected between the LED driver 20 and the LED module 30 for connecting or disconnecting the LED module 30 to or from the LED driver 20.

The current controller 434 connects to the main control module 42, the power switch 432, and the current sensor 433 for adjusting the current through the LED module 30. A maximum current value Iset has been set in the current controller 434. Upon receiving the brightness ratio from the main control module 42, the maximum current value Iset will be multiplied by the brightness ratio to obtain a reference current.

Based on the current I1 flowing through the LED module 30 detected by the current sensor 433, the current controller 434 determines whether the current I1 flowing through the LED module 30 is larger or smaller than the calculated reference current. If the current flowing through the LEP light 30 is smaller than the reference current, the duty cycle of the power switch 432 will be increased. Otherwise, the duty cycle of the power switch 432 will be decreased.

Furthermore, the current controller 434 and the main control module 42 can be separate chips or be integrated on the same chip.

The power switch 432 is a field effect transistor (FET). The current regulator 431 includes at least a diode D and an inductor L.

When the occupancy sensing module 41 detects a person around, the main control module 42 receives the sensing signal and accordingly outputs a high brightness ratio to increase the brightness of the LED module 30 (e.g., increasing the brightness to 50%). If the occupancy sensing module 41 detects no object around, a low brightness ratio is output to reduce the brightness of the LED module 30 (e.g., adjusting the brightness to 10%, or to 0%, i.e. completely off). In comparison with the conventional control device that simply turns on or off an LED light, the occupancy sensor 40 of the present invention allows setting different brightness values.

The current control module 43 adjusts the ratio of turn-on and turn-off time in the duty cycle for the power switch 432. Therefore, when an inrush current from the LED driver 20 suddenly occurs, the current controller 434 recognizes that the current flowing through the LED module 30 has been greater than the reference current, thereby reducing the switch duty cycle for the power switch 432. Thus, the conduction time of the LED module 30 is reduced to decrease the current flowing through the LED module 30.

Conversely, when the current through the LED module 30 is smaller than the reference current, the current control module 43 increases the duty cycle to enlarge the current flowing through the LED module 30 increases.

The present invention can stabilize the current output for the LED module 30. This can avoid damages to the LED module 30 and elongate its lifetime. Furthermore, the invention provides the functions of activating the LED light with the possibility of different brightness levels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An occupancy sensor for electrically connected between an LED driver and an LED module, said occupancy sensor comprising:
   an occupancy sensing module with capability of sensing occupancy status of a specific area and producing a signal while an object is entering the specific area;
   a main control module with capability of processing the signal from the occupancy sensing module and controlling;
   a current control module electrically connected to the main control module with capability of regulating a driving current output for the LED module, said current control module comprising:
   a current regulator, a power switch, a current sensor and a current controller all electrically connected to control the driving current output for the LED module;
   wherein the current controller multiplies a maximum current value by a brightness ratio from the main control module to obtain a reference current for controlling the power switch, increases a duty cycle of the power switch when the current through the LED module is smaller than the reference current, and reduces the duty cycle of the power switch when the current through the LED module is larger than the reference current.

2. The occupancy sensor of claim 1, wherein the occupancy sensing module is a passive infrared sensor, an ultrasonic Doppler sensor or a high frequency Doppler sensor.

3. The occupancy sensor of claim 2, wherein the current control module is comprised of a field effect transistor (FET) for power switching, a diode and an inductor for current regulating.

4. The occupancy sensor of claim 3, wherein the main control module and the current control module are with separate chips.

5. The occupancy sensor of claim 3, wherein the main control module and the current control module are integrated on a single chip.

6. The occupancy sensor of claim 1, wherein the current control module is comprised of a field effect transistor (FET) for power switching, a diode and an inductor for current regulating.

7. The occupancy sensor of claim 6, wherein the main control module and the current control module are with separate chips.

8. The occupancy sensor of claim 6, wherein the main control module and the current control module are integrated on a single chip.

* * * * *